United States Patent
Nguyen et al.

(10) Patent No.: US 8,134,573 B2
(45) Date of Patent: Mar. 13, 2012

(54) ENCODING CMYK DATA FOR DISPLAY USING INDEXED RGB

(75) Inventors: Uoc H. Nguyen, Long Beach, CA (US); James E. Owen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 490 days.

(21) Appl. No.: 12/390,909

(22) Filed: Feb. 23, 2009

(65) Prior Publication Data

US 2010/0214315 A1 Aug. 26, 2010

(51) Int. Cl.
- *G09G 5/02* (2006.01)
- *G06F 15/00* (2006.01)
- *G03F 3/08* (2006.01)
- *G06K 9/00* (2006.01)
- *G06K 9/36* (2006.01)
- *G06K 9/40* (2006.01)
- *H03M 7/00* (2006.01)

(52) U.S. Cl. ........ 345/603; 345/581; 345/589; 345/600; 345/591; 358/1.1; 358/1.9; 358/518; 358/519; 341/1; 341/50; 382/166; 382/237; 382/254; 382/276

(58) Field of Classification Search .......... 345/427–428, 345/581, 589–591, 596, 600, 601–605, 549, 345/690; 348/254, 552; 358/1.1, 1.9, 501, 358/518, 519, 523; 382/162, 166, 167, 232, 237, 254, 274, 276; 341/1, 50, 97–99

See application file for complete search history.

(56) References Cited

U.S. PATENT DOCUMENTS

| | | | |
|---|---|---|---|
| 5,930,010 A * | 7/1999 | Cheung et al. | 358/534 |
| 6,034,667 A | 3/2000 | Barrett | |
| 2004/0150842 A1 | 8/2004 | Sanger et al. | |
| 2008/0062480 A1* | 3/2008 | Iizuka et al. | 358/518 |
| 2010/0007688 A1* | 1/2010 | Gao et al. | 347/14 |
| 2010/0207978 A1* | 8/2010 | Usui | 347/10 |

FOREIGN PATENT DOCUMENTS

| | | |
|---|---|---|
| JP | 04-331165 | 11/1992 |
| JP | 06-218989 | 8/1994 |
| JP | 09-022279 | 1/1997 |
| JP | 11-151836 | 6/1999 |
| JP | 2000-198239 | 7/2000 |
| JP | 2002-073297 | 3/2002 |
| JP | 2002-236566 | 8/2002 |
| JP | 2003-162713 | 6/2003 |
| JP | 2004-178126 | 6/2004 |
| JP | 2005-059363 | 3/2005 |
| JP | 2006-333066 | 12/2006 |

* cited by examiner

*Primary Examiner* — Wesner Sajous
(74) *Attorney, Agent, or Firm* — Michael Blaine Brooks, PC; Michael B. Brooks; David Ripma

(57) ABSTRACT

Machine-enabled methods of, and devices for, encoding color bitmap data as indexed red-green-blue (RGB) data for display.

20 Claims, 11 Drawing Sheets

| # | BIN | RGB VALUE | COLOR NAME |
|---|---|---|---|
| 0 | 0000 | 0,0,0 | WHITE |
| 1 | 0001 | 255,255,255 | BLACK (K) |
| 2 | 0010 | 255,255,0 | YELLOW |
| 3 | 0011 | 255,255,255 | BLACK (K) |
| 4 | 0100 | 255,0,255 | MAGENTA |
| 5 | 0101 | 255,255,255 | BLACK (K) |
| 6 | 0110 | 255,0,0 | RED (Y+M) |
| 7 | 0111 | 255,255,255 | BLACK (K) |
| 8 | 1000 | 0,255,255 | CYAN |
| 9 | 1001 | 255,255,255 | BLACK (K) |
| 10 | 1010 | 0,255,0 | GREEN(C+Y) |
| 11 | 1011 | 255,255,255 | BLACK (K) |
| 12 | 1100 | 0,0,255 | BLUE (C+M) |
| 13 | 1101 | 255,255,255 | BLACK (K) |
| 14 | 1110 | 255,255,255 | BLACK (K) |
| 15 | 1111 | 255,255,255 | BLACK (K) |

FIG. 5

| # | BIN | RGB VALUE | COLOR NAME |
|---|---|---|---|
| 0 | 0000 | 0,0,0 | WHITE |
| 1 | 0001 | 0,255,255 | CYAN |
| 2 | 0010 | 255,0,255 | MAGENTA |
| 3 | 0011 | 0,0,255 | BLUE (C+M) |
| 4 | 0100 | 255,255,0 | YELLOW |
| 5 | 0101 | 0,255,0 | GREEN(C+Y) |
| 6 | 0110 | 255,0,0 | RED (Y+M) |
| 7 | 0111 | 255,255,255 | BLACK (K) |
| 8 | 1000 | 255,255,255 | BLACK (K) |
| 9 | 1001 | 255,255,255 | BLACK (K) |
| 10 | 1010 | 255,255,255 | BLACK (K) |
| 11 | 1011 | 255,255,255 | BLACK (K) |
| 12 | 1100 | 255,255,255 | BLACK (K) |
| 13 | 1101 | 255,255,255 | BLACK (K) |
| 14 | 1110 | 255,255,255 | BLACK (K) |
| 15 | 1111 | 255,255,255 | BLACK (K) |

FIG. 8

| # | BIN | RGB VALUE | COLOR NAME |
|---|---|---|---|
| 0 | 0000 | 0,0,0 | WHITE |
| 1 | 0000001 | 255,255,255 | BLACK (K) |
| 12 | 00001100 | 255,255,0 | YELLOW |
| ... | ... | ... | ... |
| 48 | 00110000 | 255,0,255 | MAGENTA |
| ... | ... | ... | ... |
| 60 | 00111100 | 255,0,0 | RED (Y+M) |
| ... | ... | ... | ... |
| 192 | 11000000 | 0,255,255 | CYAN |
| ... | ... | ... | ... |
| 204 | 11001100 | 0,255,0 | GREEN(C+Y) |
| ... | ... | ... | ... |
| 240 | 11110000 | 0,0,255 | BLUE (C+M) |
| ... | ... | ... | ... |
| 255 | 11111111 | 255,255,255 | BLACK (K) |

FIG. 10

| # | BIN | RGB VALUE | COLOR NAME |
|---|---|---|---|
| 0 | 0000 | 0,0,0 | WHITE |
| 1 | 0001 | 17,17,17 | GRAY |
| 2 | 0010 | 34,34,34 | GRAY |
| 3 | 0011 | 51,51,51 | GRAY |
| 4 | 0100 | 68,68,68 | GRAY |
| 5 | 0101 | 85,85,85 | GRAY |
| 6 | 0110 | 102,102,102 | GRAY |
| 7 | 0111 | 119,119,119 | GRAY |
| 8 | 1000 | 136,136,136 | GRAY |
| 9 | 1001 | 153,153,153 | GRAY |
| 10 | 1010 | 170,170,170 | GRAY |
| 11 | 1011 | 187,187,187 | GRAY |
| 12 | 1100 | 204,204,204 | GRAY |
| 13 | 1101 | 221,221,221 | GRAY |
| 14 | 1110 | 238,238,238 | GRAY |
| 15 | 1111 | 255,255,255 | BLACK (K) |

FIG. 11

ENCODING CMYK DATA FOR DISPLAY USING INDEXED RGB

CROSS-REFERENCE TO RELATED APPLICATIONS

This application is related to U.S. patent application Ser. No. 12/390,988, entitled "ENCODING OF NON-INDEXED DATA FOR PRINTING USING INDEXED RGB," by James E. Owen, filed Feb. 23, 2009, which is hereby incorporated herein by reference in its entirety for all purposes.

FIELD OF ENDEAVOR

The present invention, in its several embodiments, relates to methods and devices for encoding color data, e.g., cyan-magenta-yellow-black (CMYK) data, using indexed red-green-blue (RGB) and particularly using combined color bitmaps or interleaved data to form directly the indexed RGB color of the combined pixel array for display.

BACKGROUND

At times it is necessary to convert halftoned color data into an RGB color space, from which it may have been derived. For example, a conversion is required when a document management system is to display printed documents on an RGB display, such as the front panel of an MFP or a computer screen, and the printed document storage contains only the halftone data that may be used to print documents. This conversion can be both a conversion to RGB and a scaling down of the data from a high resolution image, i.e., the high resolution image that may have been printed, to a smaller image of lower resolution, i.e., a thumbnail image that may be shown on a display screen of the printing device.

A bitmap defines a display space and color for each pixel. The colors may be defined in different spaces, such as RGB, CMYK, and LAB. Each color may be defined as some level in a range expressed by a level definable according to bit size, e.g., 1-bit, 2-bit, 8-bit, 16-bit, and 32-bit. The arrangement of the pixels may be planar, e.g., a grayscale-like planar scheme for each of red, green and blue planes, which can be combined to generate a multiple color bitmap. The arrangement of pixels may be interleaved, where, for example in a single array, each pixel contains information pertaining to the multiple colors of the arrangement, e.g., an R level value followed by a G level of value followed by a B level of value. For the contone CMYK, the planar arrangement may comprise four grayscale-like planes. The interleaved arrangement may have a pixel defined by four constituent levels, e.g., a C level value followed by a M level value, followed by a Y level value followed by a K level value.

Color data may be expressed in a CMYK interleaved color space having few, e.g., two or three, levels of gradation due to allocated bits per color component. A conversion from CMYK to RGB may be based on lookup tables of predefined general equivalents for the CMYK data. If the CMYK data is planar, each pixel may be first converted to interleaved data and then converted to RGB via a pixel-by-pixel lookup process based on the lookup tables.

Presently, the process of displaying a halftoned image may be achieved by converting a pixel at a time to RGB. Because the possible halftoned values are limited, this pixel-by-pixel conversion can be expedited by using a lookup table with the conversions. Particularly where RGB display is much smaller than the full, i.e., printable, halftone image, some exploitation in reduction in image size for the RGB display may be made. This reduction can be performed after the conversion by standard scaling libraries that may be made available to the display. This approach involves a pixel-by-pixel conversion of the pixels of the halftone bitmap. Once the pixel-by-pixel conversion is complete, the same number of pixels are subject to a scaling process to reduce the actual number of converted pixels displayed via the display screen. Alternatively, in another method all of the pixels of the halftone bitmap are first subject to a scaling process; producing a reduced set of contone halftone pixels for conversion to RGB for display. For example, the halftoned image for printing may be scaled for RGB display by averaging multiple pixels into a much smaller contone bitmap, and then a pixel-by-pixel conversion of the contone bitmap to RGB is performed.

SUMMARY

The pixel-by-pixel conversion from print color data to RGB for a display screen draws heavily on the memory access time of the physical computing device employed. A process, device, and system, are needed that minimize, or do not practice, a pixel-by-pixel conversion from print color data to RGB for a display screen. For those embodiments where the RGB images are to be shown in a scaled down form, the scaling operation may follow the needed process, device, and system that minimize, or do not practice, a pixel-by-pixel conversion from print color data to RGB for a display screen, however, the scaling operation of the several embodiments may be handled by special processing hardware for performing such operations, e.g., a video card.

The invention, in its several embodiments may be illustrated as a process executed via a machine, device, or within a processing module of a device such as a multifunction peripheral (MFP) device. Embodiments of the present invention provide for a conversion of interleaved color data, an array of CMYK pixels, for display via an indexed RGB bitmap header and an RGB palette. For example, in order to reduce the throughput requirement of a processor converting an entire image from CMYK data to RGB data, the display of an image as CMYK data may be accomplished according to the teachings of the present invention by displaying a selected portion of the image via an RGB conversion effected by a display processor reading CMYK color data according to indexed RGB and a selected color palette.

For example, a first exemplary computer-implemented method of encoding color bitmap data as indexed red-green-blue (RGB) data for display includes steps, and not necessarily in the following order, of: (a) receiving, by a physical device, e.g., a memory store, a plurality of pixels of a non-RGB pixel array comprising an ordered set of bits; (b) receiving, e.g., via an input port, an indexed RGB palette for determining a color of at least one pixel of the plurality of pixels; and (c) outputting, by a physical processing device, the indexed RGB palette, an indexed RGB data header, and the non-RGB pixel array for display as RGB color data according to the indexed RGB palette. The computer-implemented method may further comprise steps of: (a) combining, by the physical processing device, a set of member pixel arrays by associating pixels across the member pixel arrays according to a shared relative location in two-space to form a combined pixel array, wherein each pixel of the combined pixel array comprises an ordered set of bits representing the respective states of each of the associated pixels across the set of member pixel arrays. In some embodiments, the set of member pixel arrays comprises: (a) a first pixel array representing, via a state for each pixel of the first pixel array, a first primary color bitmap; (b) a second pixel array representing, via a state for each pixel of the second pixel array, a second primary color bitmap; (c) a third pixel array representing, via a state for each pixel of the third pixel array, a third primary color bitmap; and (d) a fourth binary pixel array representing, via a state for each pixel of the fourth pixel array, a black bitmap. In some embodiments, at least one of the first pixel array, second pixel array, third pixel array and fourth pixel array comprise an array comprising 1-bit pixels and, in other embodiments, 2-bit pixels, or higher bit pixels. In other embodiment, the indexed RGB palette is indexed for sixteen colors, and in other embodiments, the provided indexed RGB palette is indexed for 256 colors or other values of colors.

Another computer-implemented method of encoding non-RGB color bitmap data as indexed red-green-blue (RGB) data for display may comprise steps of: (a) receiving an indexed RGB palette by a physical computing device, e.g., a processing device having a addressable member; (b) combining the indexed RGB palette, an indexed RGB header, and a bitmap header with a pixel array of pixels comprising an ordered set of bits representing non-RGB color data; and (c) displaying a plurality of pixels of the pixel array of the non-RGB color data according to index values for each of the ordered set of bits of the plurality of pixels and based on the indexed RGB palette equivalent. In some embodiments, the computer-implemented method may further comprise outputting the combined bitmap header with the pixel array of color data and indexed RGB palette. Some embodiments may further comprise: combining a set of member pixel arrays, to form the pixel array of color data, by associating pixels across the set of member pixel arrays according to a shared relative location in two-space to form a combined pixel array wherein each pixel of the combined pixel array comprises an ordered set of bits representing the respective states of each of the associated pixels across the member pixel arrays. The set of member pixel arrays may comprise: (a) a first pixel array representing, via a state for each pixel of the first pixel array, a first primary color bitmap; (b) a second pixel array representing, via a state for each pixel of the second pixel array, a second primary color bitmap; (c) a third pixel array representing, via a state for each pixel of the third pixel array, a third primary color bitmap; and (d) a fourth binary pixel array representing, via a state for each pixel of the fourth pixel array, a black bitmap. In some embodiments, at least one of the first pixel array, second pixel array, third pixel array and fourth pixel array comprise an array comprising 1-bit pixels, 2-bit pixels, or higher bit pixels.

A machine or device embodiment of the present invention may be a stand-alone processing device, a processing module incorporated in processing systems such as an MFP device, or distributed in modules within an MFP or between two or more devices such as an MFP and a user's personal computer and/or MFP and a server. Accordingly, an exemplary processing device embodiment may be configured to encode non-RGB color bitmap data as indexed red-green-blue (RGB) data for display, where the exemplary processing device comprises: a processing device configured to encode non-RGB color bitmap data as indexed red-green-blue (RGB) data for display comprising: (a) a receiving portion configured to input an indexed RGB palette and (b) a processor unit and accessible memory, where the processor unit may be configured to execute instructions to: (a) combine the indexed RGB palette, an indexed RGB header, and a bitmap header with a pixel array of pixels comprising ordered set of bits representing non-RGB color data; and (b) send for display a plurality of pixels of the pixel array of the non-RGB color data according to index values for each of the ordered set of bits of the plurality of pixels and based on the indexed RGB palette equivalent. In some machine embodiments, the processing unit is further configured to execute instructions to input a set of member pixel arrays comprising associated pixels across the member pixel arrays according to a shared relative location in two-space to form the plurality of pixels of the pixel array of color data, wherein the plurality of pixels comprises an ordered set of bits representing the respective states of each of the associated pixels across the member pixel arrays. In some device embodiments, the receiving portion may be further configured to input a set of member pixel arrays comprising: (a) a first pixel array representing, via a state for each pixel of the first pixel array, a first primary color bitmap; (b) a second pixel array representing, via a state for each pixel of the second pixel array, a second primary color bitmap; (c) a third pixel array representing, via a state for each pixel of the third pixel array, a third primary color bitmap; and (d) a fourth binary pixel array representing, via a state for each pixel of the fourth pixel array, a black bitmap. In still other embodiments, the processor unit may be further configured to execute instructions to: combine a bitmap header with the pixel array and indexed RGB palette; and output the combined bitmap header with the pixel array and indexed RGB palette. In some device embodiments, the at least one of the first pixel array, second pixel array, third pixel array and fourth pixel array comprise an array comprising 2-bit pixels and/or higher bit pixels, and the provided indexed RGB palette may be indexed for 256 colors or other values of colors.

BRIEF DESCRIPTION OF THE DRAWINGS

Embodiments of the present invention are illustrated by way of example and not limitation in the figures of the accompanying drawings, and in which:

FIG. 5 is a tabular depiction of an exemplary palette expressed as 4-bpp indexed RGB;

FIG. 8 is a tabular depiction of an exemplary palette expressed as 4-bpp indexed RGB;

FIG. 10 is a tabular depiction of an exemplary palette expressed as 8-bpp indexed RGB; and FIG. 11 is a tabular depiction of an exemplary palette expressed as 4-bpp indexed RGB.

DETAILED DESCRIPTION

Figure 1:
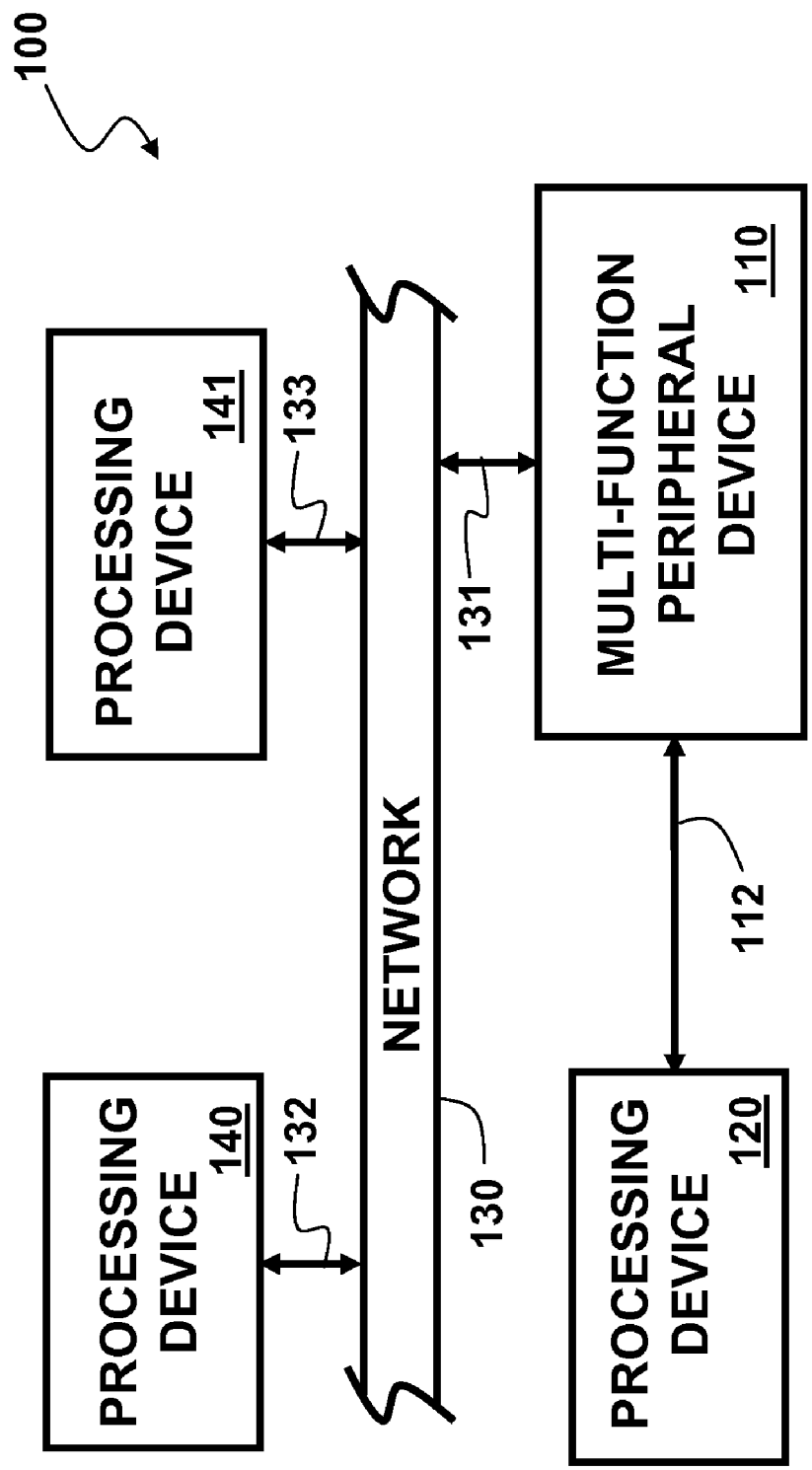
FIG. 1 illustrates, at a top level, an exemplary system comprising a plurality of processing devices in communication with a multi-function peripheral (MFP) device.

FIG. 1 illustrates an exemplary system embodiment 100 of the present invention where a printing device or a multi-functional peripheral (MFP) device 110 may be in direct communication 112 with a processing device 120, such as a computer hosting one or more drivers applicable to the printing device or multi-functional peripheral device 110. In addition, via a network 130 and a network link 131-133, the printing device or a multi-functional peripheral device 110 may be in communication with one or more processing devices 140, 141, such as a one or more computers that may each host one or more drivers applicable to the printing device or the MFP device 110.

Figure 2:
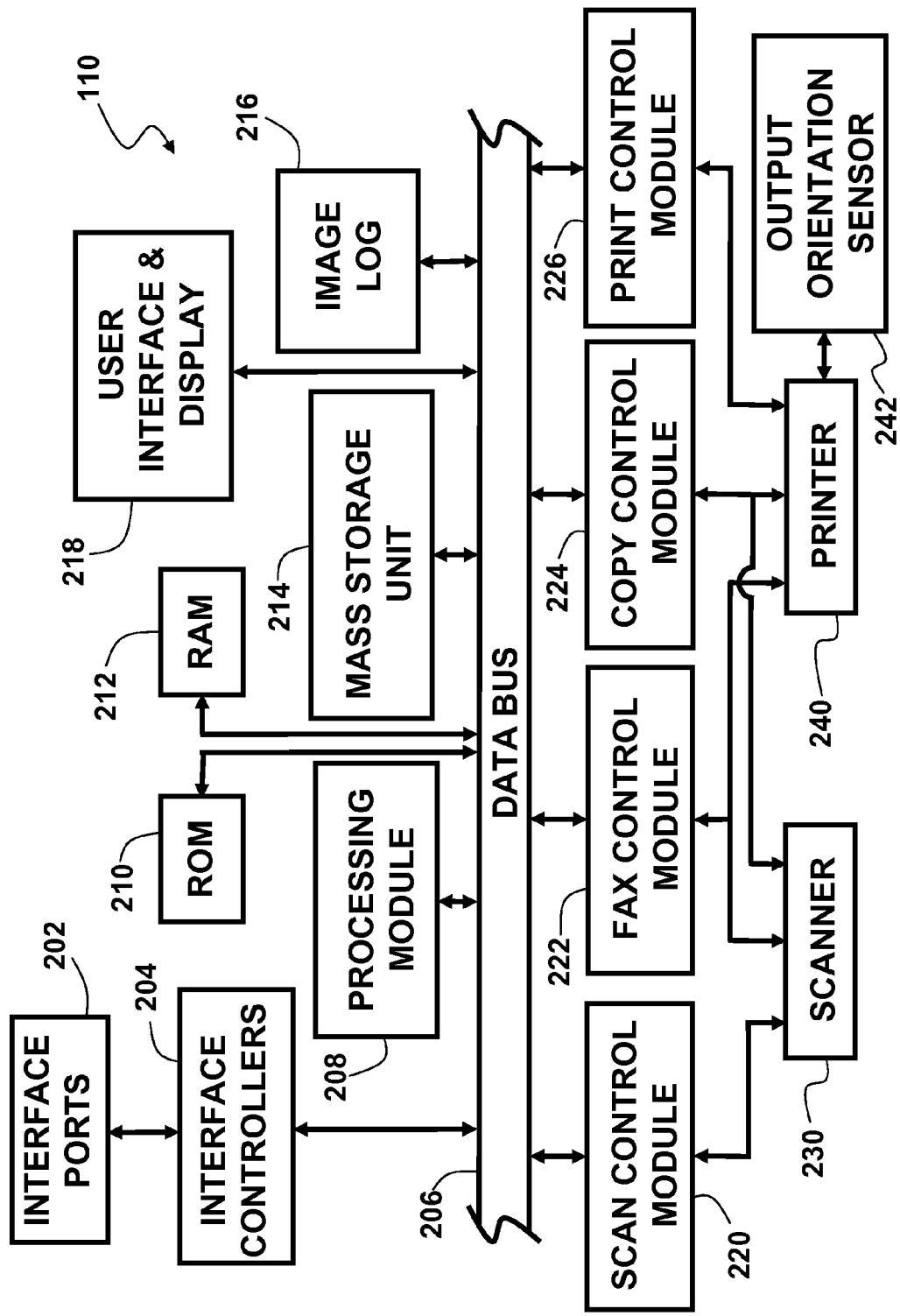
FIG. 2 illustrates a top level functional block diagram of an exemplary MFP device.

The exemplary printing device or MFP device 110 of FIG. 1 may be illustrated in greater exemplary functional detail in FIG. 2. Interface ports 202 may be present to connect a printer cable, a network link, or an external wireless module. The interface ports 202 may be serviced by one or more interface controllers 204 that function to direct communications and/or condition signals between the respective interface port 202 and one or more modules of the MFP device 110 which may be in common communication via a data bus 206. The MFP device 110 may include one or more processing modules 208 that may draw data from read-only memory (ROM) 210 and exchange data with random access memory (RAM) 212 and may store files having sizes greater than the RAM 212 capacity in one or more mass storage units 214. The MFP device 110 may maintain a log of its images 216 and have a user display and interface 218. The image log 216 may be a separate module or distributed, for example, with a portion executed via the processing module 208 that may access parameters, files, and/or indices that may be stored in ROM 210, RAM 212, a mass storage unit 214 or in combination thereof. The MFP device 110 may include as individual or separate modules a scan control module 220, a facsimile (FAX) control module 222, and a copy control module 224 where each module may service the scanner 230 to direct communications and/or condition signals between the scanner 230 and one or more modules of the MFP device 110, for example, via the data bus 206. The MFP device 110 may include as individual or separate modules the FAX control module 222, the copy control module 224 and a print control module 226 where each module may service the printer 240 to direct communications and/or condition signals between the printer 240 and the one or more modules of the MFP device 110, for example, via the data bus 206. The exemplary MFP device 110 may store a calibration table in ROM 210, RAM 212, a mass storage unit 214 or in combination thereof and accordingly, the calibration table may be accessed by the print control module 226 and/or a processing module 208 and made available to devices external to the MFP device 110 via one or more interface ports 202. The exemplary MFP device 110 may have notice, for example, due to a user input via the user interface 218 or sensed by an output orientation sensor 242 of the printer 240 and may be communicated via the print control module 226 to devices external to the MFP device 110 via one or more interface ports 202.

Figure 3:
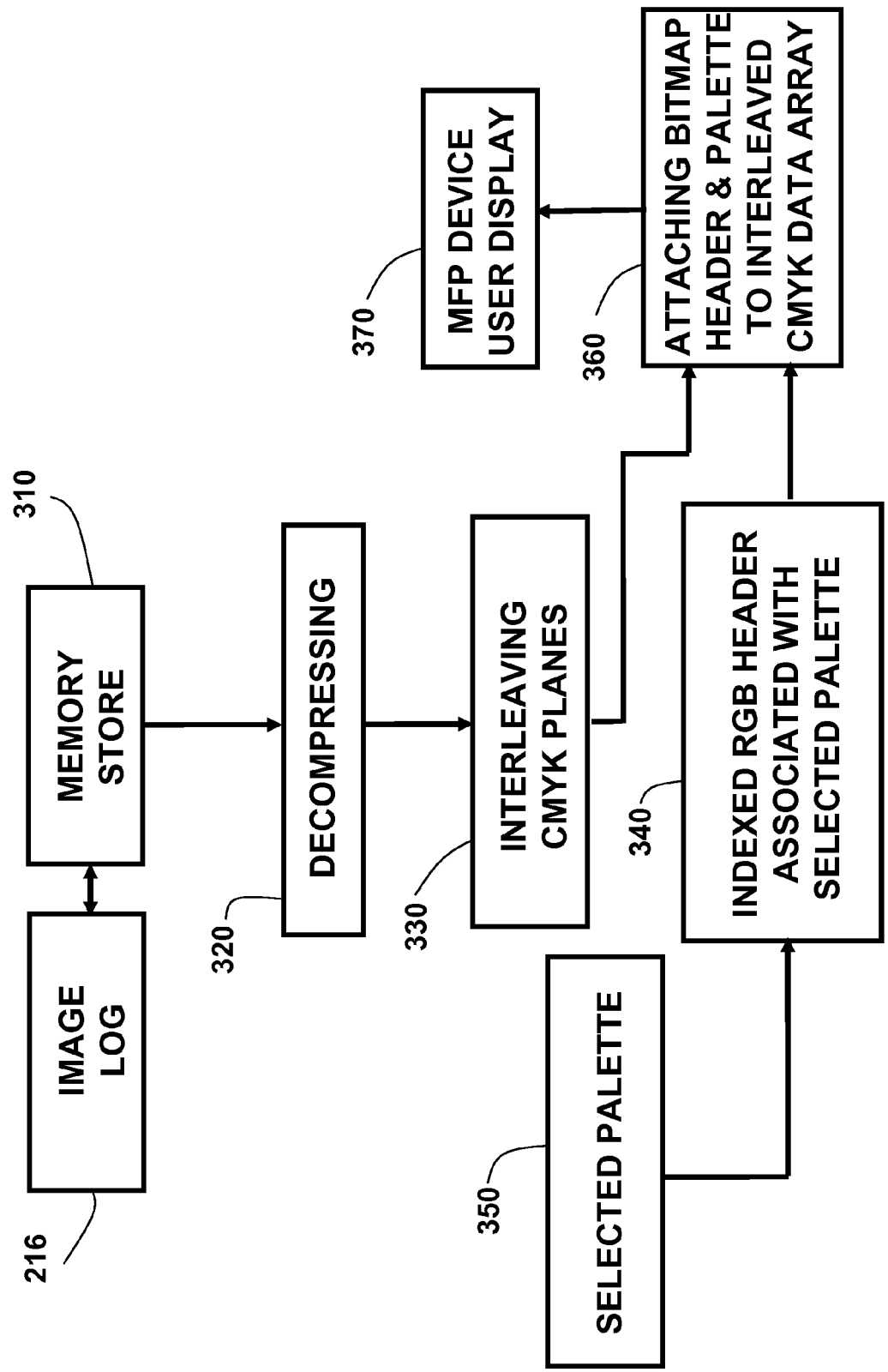
FIG. 3 illustrates a top level functional block diagram of an exemplary process within an exemplary MFP device for converting by displaying non-RGB color data having an associated indexed RGB header and pallete.

Illustrated in FIG. 3 is a functional block diagram of an exemplary process within an exemplary MFP device for converting and displaying graphics data where images may be logged via an image log and the images may be stored in a compressed format as pages or bands of graphic data. Accordingly, one or more compressed pages or bands may be read from a memory store 310 and decompressed into planes (step 320). The decompressed bands or planes may then be interleaved (step 330). For example, a magenta 1-bit halftone plane may be interleaved between a cyan 1-bit halftone plane and yellow 1-bit halftone plane and the yellow 1-bit halftone plane may be interleaved between the magenta 1-bit halftone plane and a 1-bit black halftone plane. A palette may be defined or selected (step 350). An indexed RGB header may be associated with the selected palette (step 340). The indexed RGB header and associated palette may then be attached or otherwise associated (step 360) with the 4-bpp CMYK color data array as an example of non-RGB data. A bitmap header may be set up for 4-bpp indexed RGB and the CMYK color data may be treated by video processing as RGB data according to the indexed RGB header, colored according to the selected palette, and may be scaled before being sent to the display 370 of the MFP device. Accordingly, the interleaved and recorded state of each pixel for each plane, in this example as an ordered set four interleaved bits, or a provided interleaved non-RGB color data array may then be effectively converted (step 370) to RGB data by being processed as a 4-bpp RGB bitmap, due to the indexed RGB header, according to the defined RGB palette. In addition, the processing unit of the MFP device may be a general processor, a special processor, and/or may be a video card configured to process the CMYK color data according to the indexed RGB data and palette to generate a scaled RGB array for display 370.

Figure 4:
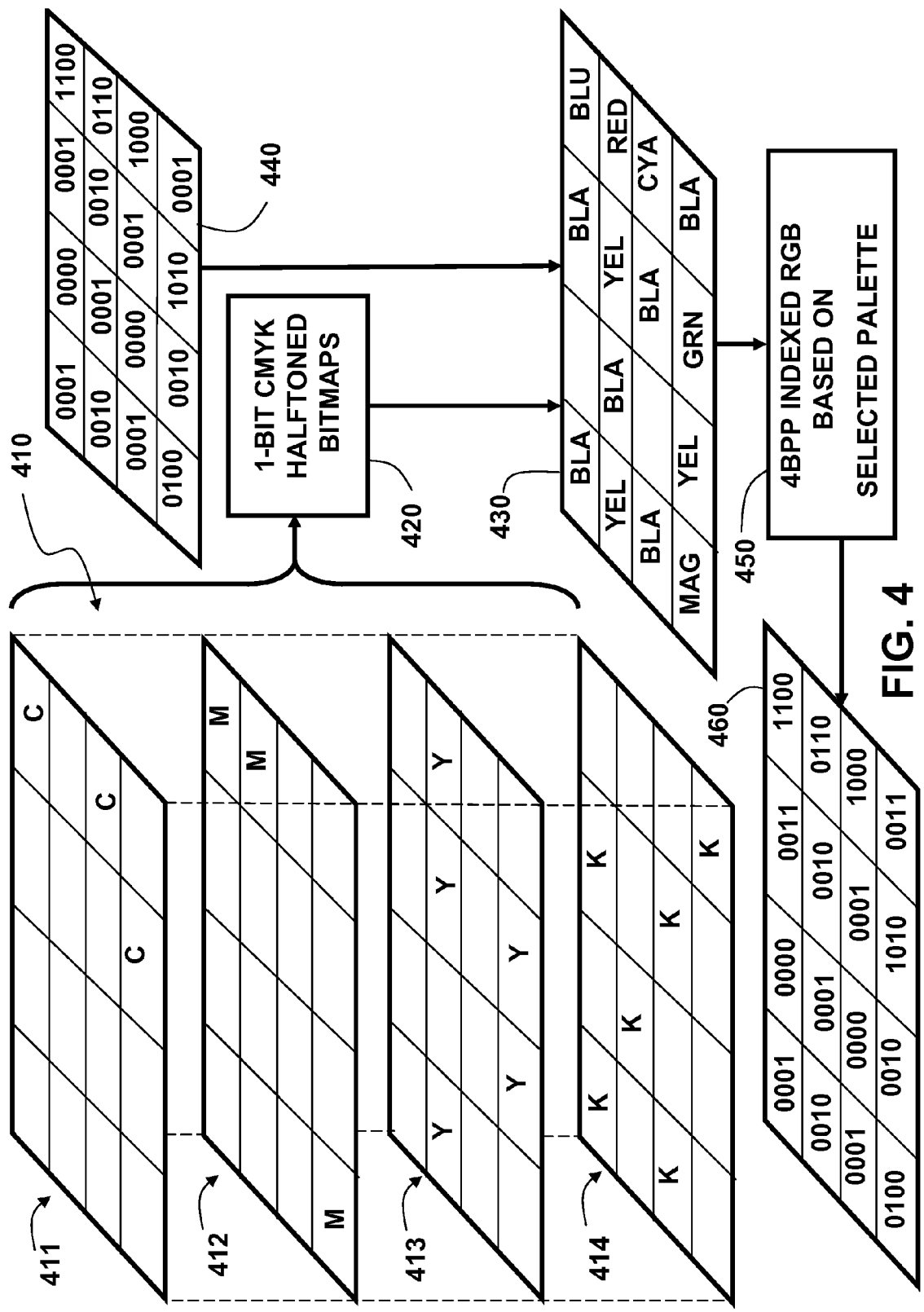
FIG. 4 is a graphical depiction of an exemplary interleaving of 1-bit CMYK halftoned bitmaps to 4-bpp indexed RGB.

FIG. 4 depicts graphically the mapping of a portion of an image which, in this example, is a four-by-four set of 4-bit pixel depth 410 where each bit is represented in a color plane or bitmap level of depth, i.e., single bit-per-pixel (1-bpp) halftoned CMYK data. The top exemplary plane 411 represents a halftoned 1-bit cyan, C, bitmap. The next exemplary plane 412 below the cyan bitmap represents a halftoned 1-bit magenta, M, bitmap. The next exemplary plane 413 below the magenta bitmap represents a halftoned 1-bit yellow, Y, bitmap. The bottom exemplary plane 414 represents the halftoned 1-bit black, K, bitmap. These four planes 411-414, when aligned, express as 1-bit planes a 4-bit bitmap. Applying the CMYK scheme 420 to these 1-bit planes 411-414 of a bitmap, the resulting 4-bit bitmap 430 may be expressed in exemplary fashion as black (BLA←K), blue (BLU←C+M), yellow (YEL←Y), red (RED←M+Y), cyan (CYA←C), magenta (MAG←M), and green (GRN←C+Y). Two-space as it is used here includes a geometrically expressed line of pixels such as m×1 as well as a block, rectangle or matrix of pixels such as m×n. Rather than represent the color information for a bitmap in the four planes 411-414, the information may be represented in an interleaved bitmap 440 where in this example a 1-bit level of a color component may be expressed by a "1" and in the order of the CMYK scheme. That is, the colors may be expressed in exemplary fashion as black (BLA←0001), blue (BLU←1100), yellow (YEL←0010), red (RED←0110), cyan (CYA←1000), magenta (MAG←0100), and green (GRN←1010). Whether originating from an expression in planes 411-414 or as interleaved colors 440 of non-RGB data or non-RGB color spaces, or in other embodiments as RGB data or RGB color spaces, the 4-bits per pixel (bpp) representation 430, in this example, may be mapped 450, based on a selected palette and according to 4 bbp indexed RGB 460.

File formats like TIF and JPG store a 24 bit RGB value for each of the millions of image pixels. But GIF files only store a 4 or 8 bit index at each pixel, so that the image data is ⅙ or ⅓ the size of 24 bits. Indexed Color is limited to 256 colors, which can be any 256 from the set of 16.7 million 24 bit colors. Each color used is a 24 bit RGB value. Each such image file contains its own color palette, which is a list of the selected 256 colors, or 16 colors in a smaller palette. Images are called indexed color because the actual image color data for each pixel is the index into this palette. Each pixel's data is a number that specifies one of the palette colors, like maybe "color number 15", where the number 15 is the index (e.g., first or index column of tabular FIG. 5) into the palette, the fifth color in the palette list of colors. Reference must be made to the palette to determine the color is being indexed. The palette may be stored in the file with the image.

The index may be a 4-bit value that yields 16 colors or an 8-bit value that yields 256 colors for each pixel. The first RGB color in the table is index 0, the second RGB color is index 1, and so on. While an 8-bit number can only contain a numerical value of 0 to 255, i.e., only 256 colors can be in the palette of possible colors, the use of indexed color economized storage in that eight bits may be used for an indexed color of 256 colors that requires considerably less storage space or channel capacity than 24 bits for every pixel. The size of most graphics files can be limited to use 16 colors, which requires no more than 4-bit indexes. The indexed file also contains the palette too, which is the table of the selected 24 bit colors, or 3 bytes of RGB overhead for each color in the palette (768 bytes for 256 colors). Indexed files have 24 bits stored for each palette color, but not for each pixel. Each pixel stores either a 4-bit or an 8-bit index to specify which palette color is used. Four bits permit a table or palette having an index of sixteen entries. FIG. 5 illustrates an exemplary palette of sixteen color entries where each index or color value has a corresponding binary value that corresponds to a 4-bit RGB value. A mapping from the CMYK scheme to the 4-bit RGB representation may be accomplished via the color equivalencies illustrated in the color name column of FIG. 5. The exemplary palette for the bitmaps may comprise eight primary colors and eight identical blacks. In reviewing the tabular representation and particularly the 4-bit binary column, one may note that when the lowest or rightmost position is set to "1," the indexed value is black One may also not that when the lowest or rightmost position is set to "0," white or another color may be indexed. For example, the highest or leftmost position may be used to represent cyan when set to "1" or "on," the second highest position may be used to represent magenta and the third highest position may be used to represent yellow. One may also note the color combinations produced by positioning two "on" values may be used to index the colors red, green and blue. Embodiments of the present invention include those that readily scale up including two bit-per-pixel (2-bpp) halftoned data where the color, e.g., each color plane of FIG. 4, may have three levels of intensity/pigmentation. In place of an indexed 4-bpp RGB conversion, an 8-bpp RGB conversion is applied that may be based on a palette expanded over that of FIG. 5 comprising 256 color entries where the entries are selected to provide two levels each of cyan, magenta, yellow, and black.

Figure 6:
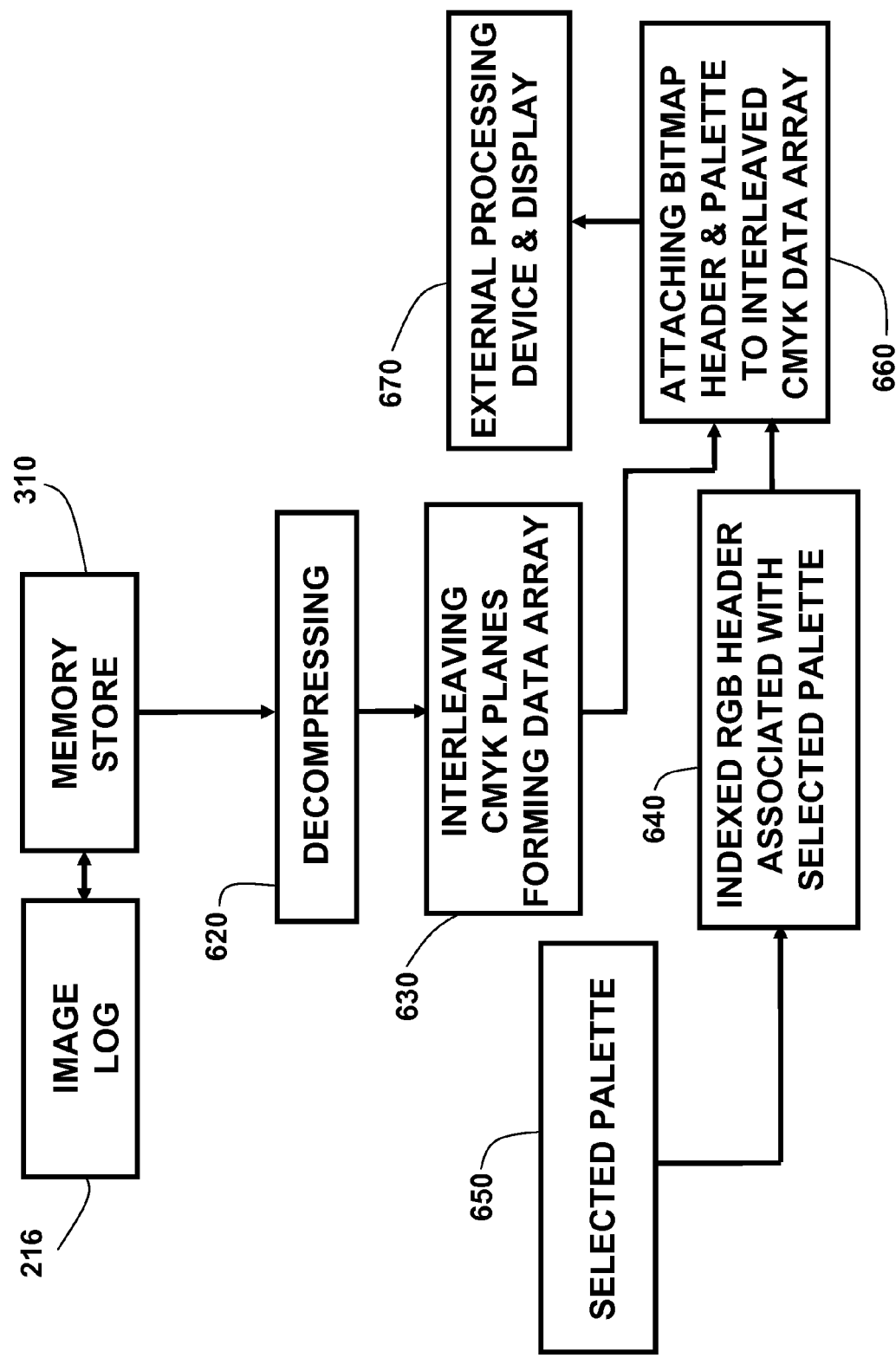
FIG. 6 illustrates a top level functional block diagram of an exemplary process within an exemplary MFP device for outputting a file for converting by displaying at an external processing device non-RGB data as RGB data.

FIG. 6 is a functional block diagram of an exemplary process within an exemplary MFP device for converting and displaying graphics data at the user display of an external processing device 670, such as at a personal computer running an operating system, e.g., MICROSOFT™ WINDOWS™, where images may be logged via an image log and the images may be stored in a 1-bpp compressed format as pages or bands of graphic data. For example, for a user to invoke or launch the display functions associated with MICROSOFT™ WINDOWS™, the graphics data may be decompressed into planes, interleaved, and then a standard MICROSOFT™ WINDOWS™ bitmap header may be attached (step 660) that specifies 4-bpp indexed RGB data having the selected palette attached. The process may scale up, for example, where the images may be stored in a 2-bpp compressed format as planes of graphic data. The eight planes of decompressed planes (step 620) may be combined into four planes of 2-bpp CMYK color data (step 630) as an example of non-RGB color data. The four planes of 2-bpp CMYK color data may be interleaved (step 630). In other embodiments, the 2-bpp CMYK color data may be provided already interleaved. With a defined or selected palette 650, and the array of 2-bpp CMYK color data, an 8-bit indexed RGB data header may be associated with the selected pallette (step 640) and a user may invoke or launch the display functions, e.g., those that may be associated with MICROSOFT™ WINDOWS™, where, a bitmap header, such as standard MICROSOFT™ WINDOWS™ bmp header may be attached (step 660) that specifies 8-bpp indexed RGB data having the selected palette attached, for example, as a file. The exemplary file may be sent to an external processing unit (step 670) for display. The processing unit may be a video card, or the processing unit may be associated with a video card configured to process the CMYK color data according to the indexed RGB data and palette in order to generate a scaled RGB array for display.

Figure 7:
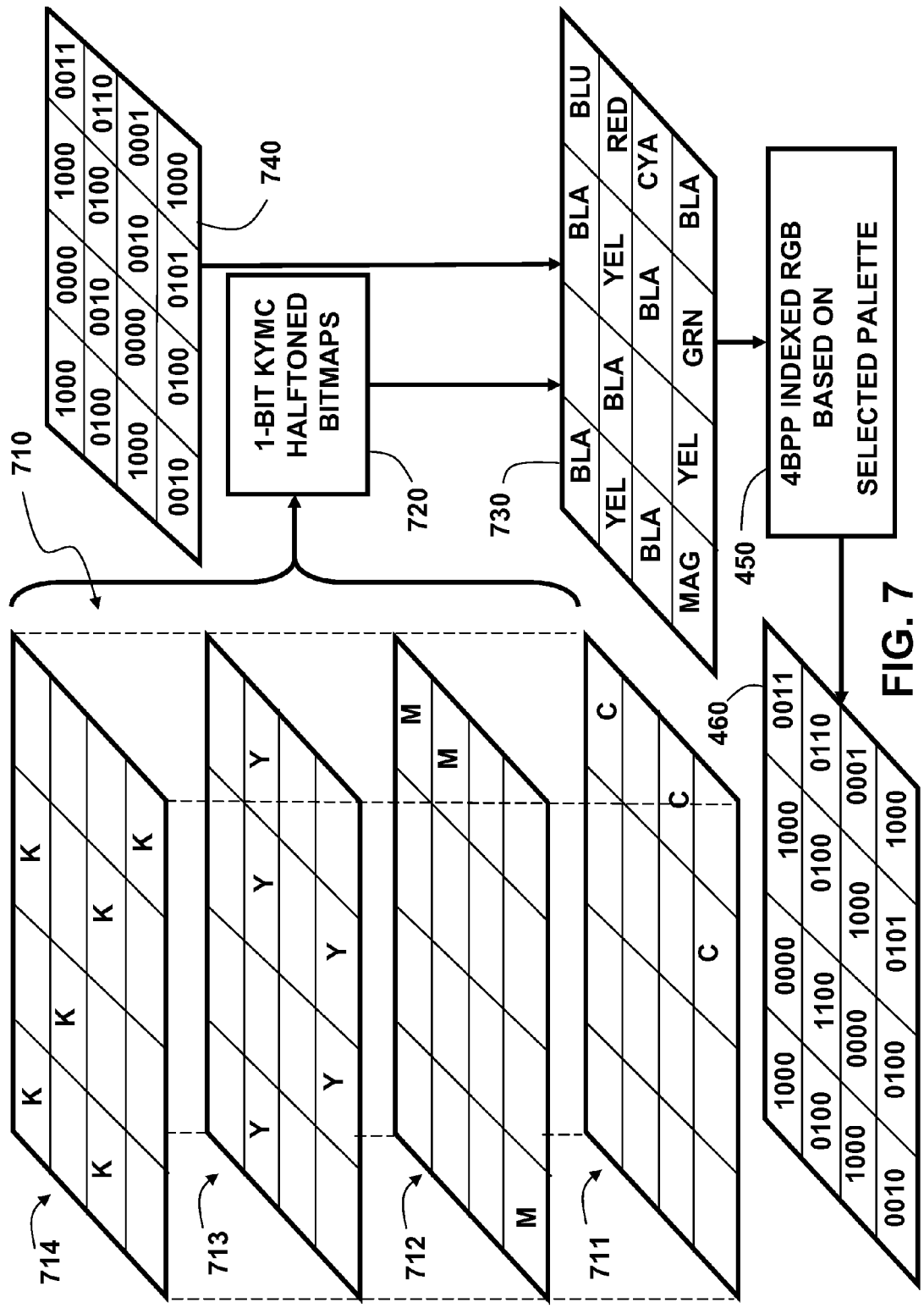
FIG. 7 is a graphical depiction of an exemplary interleaving from 1-bit KYMC halftoned bitmaps to 4-bpp indexed RGB.

While CMYK was applied by example, non-CMYK four-color schemes may be embodied with little if any change in structure and/or processing. The invention may be embodied via alternative printing systems. For example, another embodiment shown in the graphical depiction of FIG. 7, an exemplary conversion is made from 1-bit KYMC halftoned bitmaps to 4-bpp indexed RGB. FIG. 7 depicts graphically the mapping of a portion of an image which, in this example, is a four-by-four set of 4-bit pixel depth 710 where each bit is represented in a color plane or bitmap level of depth, i.e., single bit-per-pixel (1-bpp) halftoned KYMC data. The bottom exemplary plane 711 represents a halftoned 1-bit cyan, C, bitmap. The next exemplary plane 712 above the cyan bitmap represents a halftoned 1-bit magenta, M, bitmap. The next exemplary plane 713 above the magenta bitmap represents a halftoned 1-bit yellow, Y, bitmap. The top exemplary plane 714 represents the halftoned 1-bit black, K, bitmap. These four planes 711-714, when aligned, express as 1-bit planes a 4-bit bitmap. Applying the KYMC scheme 720 to these 1-bit planes 711-714 of a bitmap, the resulting 4-bit bitmap 730 may be expressed in exemplary fashion as black (BLANK), blue (BLU←C+M), yellow (YEL←Y), red (RED←M+Y), cyan (CYA←C), magenta (MAG←M), and green (GRN←C+Y). Rather than represent the color information for a bitmap in the four planes 711-714, the information may be represented in an interleaved bitmap 740 where, in this example, a 1-bit level of a color component may be expressed by a "1" and in the order of the KYMC scheme. That is, the colors may be expressed in exemplary fashion as black (BLA←1000), blue (BLU←0011), yellow (YEL←0100), red (RED←0110), cyan (CYA←0001), magenta (MAG←0010), and green (GRN←0101). Whether originating from an expression in planes 711-714 or as interleaved colors 740 of RGB data or RGB color spaces, or non-RGB data or non-RGB color spaces, the 4-bits per pixel (bpp) representation 730, in this example, may be mapped 450, based on a selected palette and according to 4 bbp indexed RGB 460.

Figure 9:
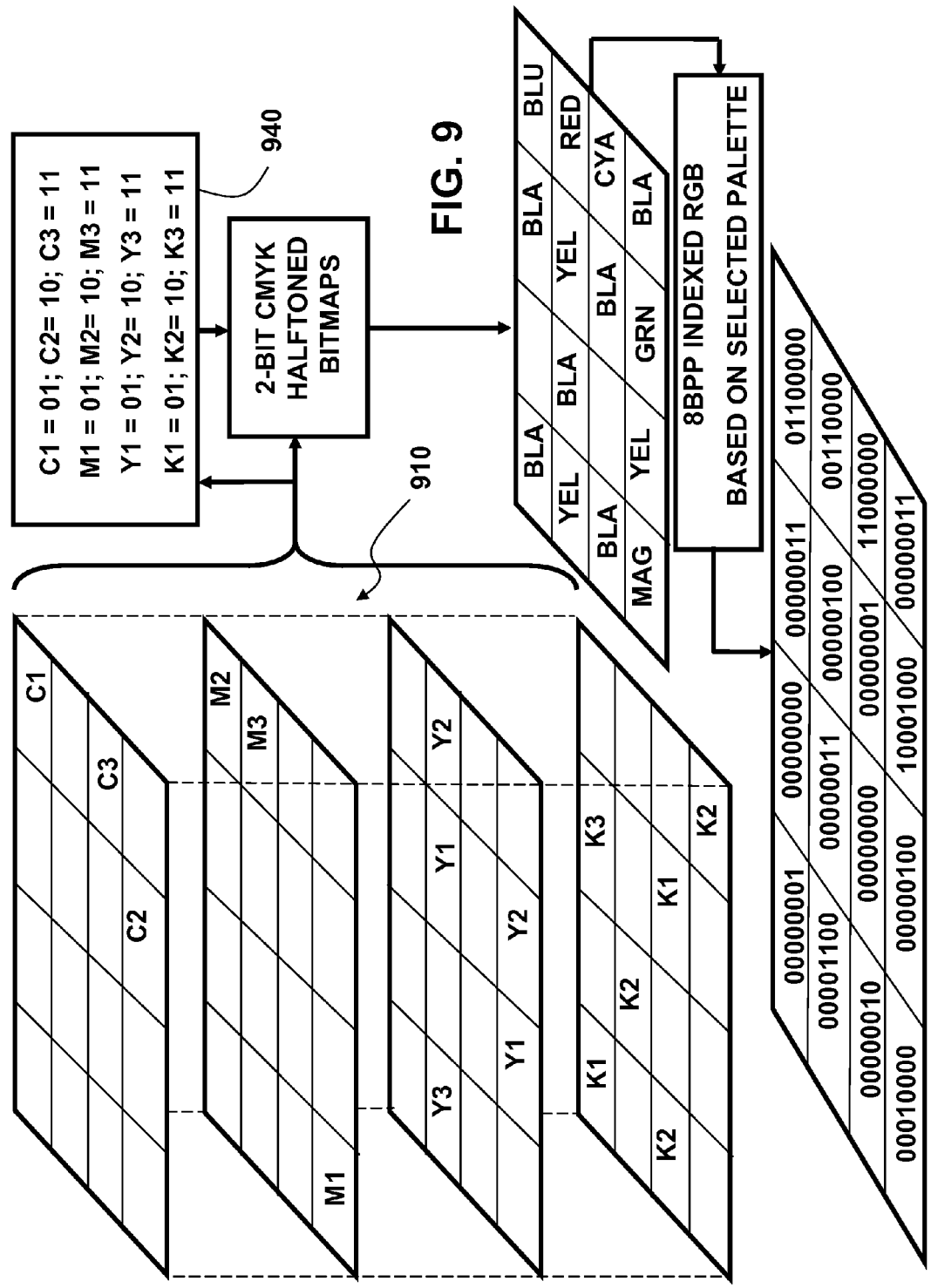
FIG. 9 is a graphical depiction of an exemplary interleaving from 2-bit CMYK halftoned bitmaps to 4-bpp indexed RGB.

FIG. 8 is a tabular depiction of an exemplary palette expressed as 4-bpp indexed RGB from the 1-bit KYMC halftoned bitmaps or directly provided by interleaved data. FIG. 9 depicts another embodiment having 2-bit CMYK halftoned bitmaps, and illustrates a graphical depiction of an exemplary conversion from 2-bit CMYK halftoned bitmaps to 4-bpp indexed RGB. As explained above in the 1-bit examples of FIGS. 4 and 7, an exemplary alternative to four color planes 910, an interleaved bitmap may represent the colors in each pixel and in this case, two bits would be allotted 940 to define the level for each of the four components in a CMYK representation, resulting in an 8-bit expression in the interleaved CMYK representation. FIG. 10 is a tabular depiction of an exemplary palette expressed as 8-bpp indexed RGB from the 2-bit CMYK halftoned bitmap or directly provided by interleaved data. The indexed RGB embodiments may include grayscales. FIG. 11 is a tabular depiction of an exemplary palette for grayscale expressed as 4-bpp indexed RGB.

One of ordinary skill in the art will also appreciate that the modules, elements, and/or functions described herein may be further subdivided, combined, and/or varied and yet still be in the spirit of the embodiments of the invention. In addition, while a number of variations of the invention have been shown and described in detail, other modifications, which are within the scope of this invention, will be readily apparent to those of ordinary skill in the art based upon this disclosure, e.g., the exemplary flowcharts or processes described herein may be modified and varied and yet still be in the spirit of the invention. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A computer-implemented method of displaying a color bitmap data as indexed red-green-blue (RGB) data comprising:
   receiving, by a physical device, a plurality of pixels of a non-RGB pixel array comprising an ordered set of bits;
   receiving an indexed RGB palette for determining a color of at least one pixel of the plurality of pixels; and
   outputting, by a physical processing device, the indexed RGB palette, an indexed RGB data header, and the non-RGB pixel array for display as RGB color data according to the indexed RGB palette.

2. The computer-implemented method of claim 1 further comprising:
   combining, by the physical processing device, a set of member pixel arrays by associating pixels across the member pixel arrays according to a shared relative location in two-space to form a combined pixel array, wherein each pixel of the combined pixel array comprises an ordered set of bits representing the respective states of each of the associated pixels across the set of member pixel arrays.

3. The computer-implemented method of claim 2 wherein the set of member pixel arrays comprises:
   a first pixel array representing, via a state for each pixel of the first pixel array, a first primary color bitmap;
   a second pixel array representing, via a state for each pixel of the second pixel array, a second primary color bitmap;
   a third pixel array representing, via a state for each pixel of the third pixel array, a third primary color bitmap; and
   a fourth binary pixel array representing, via a state for each pixel of the fourth pixel array, a black bitmap.

4. The computer-implemented method of claim 3 wherein at least one of the first pixel array, second pixel array, third pixel array and fourth pixel array comprise an array comprising 1-bit pixels.

5. The computer-implemented method of claim 1 wherein the indexed RGB palette is indexed for sixteen colors.

6. The computer-implemented method of claim 3 wherein at least one of the first pixel array, second pixel array, third pixel array and fourth pixel array comprise an array comprising 2-bit pixels.

7. The computer-implemented method of claim 1 wherein the provided indexed RGB palette is indexed for 256 colors.

8. A computer-implemented method of encoding color bitmap data as indexed red-green-blue (RGB) data for display comprising:
   receiving by a physical computing device an indexed RGB palette;
   combining the indexed RGB palette, an indexed RGB header, and a bitmap header with a pixel array of pixels comprising an ordered set of bits representing non-RGB color data; and
   displaying a plurality of pixels of the pixel array of the non-RGB color data according to index values for each of the ordered set of bits of the plurality of pixels and based on the indexed RGB palette equivalent.

9. The computer-implemented method of claim 8 further comprising outputting the combined bitmap header with the pixel array of color data and indexed RGB palette.

10. The computer-implemented method of claim 8 further comprising:
    combining a set of member pixel arrays, to form the pixel array of color data, by associating pixels across the set of member pixel arrays according to a shared relative location in two-space to form a combined pixel array wherein each pixel of the combined pixel array comprises an ordered set of bits representing the respective states of each of the associated pixels across the member pixel arrays.

11. The computer-implemented method of claim 10 wherein the set of member pixel arrays comprises:
    a first pixel array representing, via a state for each pixel of the first pixel array, a first primary color bitmap;
    a second pixel array representing, via a state for each pixel of the second pixel array, a second primary color bitmap;
    a third pixel array representing, via a state for each pixel of the third pixel array, a third primary color bitmap; and
    a fourth binary pixel array representing, via a state for each pixel of the fourth pixel array, a black bitmap.

12. The computer-implemented method of claim 11 wherein at least one of the first pixel array, second pixel array, third pixel array and fourth pixel array comprise an array comprising 1-bit pixels.

13. The computer-implemented method of claim 12 wherein the provided indexed RGB palette is indexed for sixteen colors.

14. The computer-implemented method of claim 11 wherein at least one of the first pixel array, second pixel array, third pixel array and fourth pixel array comprise an array comprising 2-bit pixels.

15. The computer-implemented method of claim 14 wherein the provided indexed RGB palette is indexed for 256 colors.

16. A processing device configured to encode color bitmap data as indexed red-green-blue (RGB) data for display comprising:
    a receiving portion configured to input an indexed RGB palette and
    a processor unit and accessible memory, the processor unit configured to execute instructions to:
       combine the indexed RGB palette, an indexed RGB header, and a bitmap header with a pixel array of pixels comprising an ordered set of bits representing non-RGB color data; and
       send for display a plurality of pixels of the pixel array of the non-RGB color data according to index values for each of the ordered set of bits of the plurality of pixels and based on the indexed RGB palette equivalent.

17. The processing device of claim 16 wherein the processing unit is further configured to execute instructions to input a set of member pixel arrays comprising associated pixels across the member pixel arrays according to a shared relative location in two-space to form the plurality of pixels of the pixel array of color data, wherein the plurality of pixels comprises an ordered set of bits representing the respective states of each of the associated pixels across the member pixel arrays.

18. The processing device of claim 17 wherein the receiving portion is further configured to input a set of member pixel arrays comprising:
   a first pixel array representing, via a state for each pixel of the first pixel array, a first primary color bitmap;
   a second pixel array representing, via a state for each pixel of the second pixel array, a second primary color bitmap;
   a third pixel array representing, via a state for each pixel of the third pixel array, a third primary color bitmap; and
   a fourth binary pixel array representing, via a state for each pixel of the fourth pixel array, a black bitmap.

19. The processing device of claim 16 wherein at least one of the first pixel array, second pixel array, third pixel array and fourth pixel array comprise an array comprising 2-bit pixels.

20. The processing device of claim 16 wherein the provided indexed RGB palette is indexed for 256 colors.

* * * * *